(12) United States Patent
Shigi et al.

(10) Patent No.: US 6,266,070 B1
(45) Date of Patent: Jul. 24, 2001

(54) CHARACTER PATTERN GENERATOR, CHARACTER GENERATING METHOD, AND STORAGE MEDIUM THEREFOR

(75) Inventors: Yutaka Shigi, Sakai; Yuka Yabuuchi, Yamatokoriyama; Tomoko Watanabe; Yoshimi Asai, both of Osaka, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/178,671

(22) Filed: Oct. 26, 1998

(30) Foreign Application Priority Data

Nov. 18, 1997 (JP) .................................................. 9-317058

(51) Int. Cl.[7] .................................................. G06F 15/00
(52) U.S. Cl. .................... 345/467; 468/469; 468/470; 468/471; 468/194; 382/258
(58) Field of Search .................................... 345/467, 468, 345/469, 470, 471, 472, 465, 142, 144, 128, 174, 113, 170; 382/187, 189, 258, 200, 202, 298, 194, 198, 199

(56) References Cited

U.S. PATENT DOCUMENTS

| | | | | |
|---|---|---|---|---|
| 4,748,443 | * | 5/1988 | Uehara | 345/113 |
| 5,468,077 | * | 11/1995 | Motokada | 345/468 |
| 5,579,406 | * | 11/1996 | Morikawa | 345/170 |
| 5,727,140 | * | 3/1998 | Ohtomo | 345/472 |
| 5,771,035 | * | 6/1998 | Imaki | 345/471 |
| 5,825,370 | * | 10/1998 | Yoshida | 345/472 |
| 5,825,999 | * | 10/1998 | Uzaki | 345/472 |
| 5,850,228 | * | 12/1998 | Hasegawa | 345/471 |
| 5,852,448 | * | 12/1998 | Cheng | 345/469 |
| 5,920,324 | * | 7/1999 | Hasegawa | 345/471 |
| 5,940,084 | * | 8/1999 | Motokada | 345/468 |
| 5,959,635 | * | 9/1998 | Watanabe | 345/471 |
| 5,977,949 | * | 11/1999 | Itou | 345/142 |
| 6,011,561 | * | 1/2000 | Shigi | 345/471 |

FOREIGN PATENT DOCUMENTS 6-167963   6/1994 (JP) .

* cited by examiner

*Primary Examiner*—Matthew Luu
*Assistant Examiner*—Wesner Sajous
(74) *Attorney, Agent, or Firm*—Nixon & Vanderhye P.C.

(57) ABSTRACT

A character pattern generator includes: an input section for inputting an input information that contains a character code, a character style, and a character size of a character pattern to be generated; a character information storing section for storing, for each character code, a character information containing a stroke configuration information composed of skeleton coordinate data of strokes constituting the character pattern; a bit map font generating section for reading, from the character information storing section, the stroke configuration information contained in the character information based on the input information input by the input section and for generating a bit map font based on the skeleton coordinate data of the stroke configuration information that has been read; and an output section for outputting, as a character pattern, the bit map font generated by the bit map font generating section.

15 Claims, 10 Drawing Sheets

| CHARACTER CODE | CHARACTER INFORMATION | | | | |
|---|---|---|---|---|---|
| | DATA TYPE | COORDINATES | OUTLINE DATA | COMMON STROKE CONSTRUCTION INFORMATION NUMBER | CHARACTER INFORMATION CHANGE DATA FOR EACH CHARACTER STYLE |
| 947C "塔" | STROKE CONFIGURATION INFORMATION | (P1, P2) | B100 | — | CHARACTER STYLE T △P1 |
| | STROKE CONFIGURATION INFORMATION | (P3, P4) | B101 | — | CHARACTER STYLE T △P4 |
| | STROKE CONFIGURATION INFORMATION | (P5, P6) | B100 | — | |
| | .. | .. | .. | .. | .. |

Fig. 4 (2)

| CHARACTER CODE | CHARACTER INFORMATION | | | | |
|---|---|---|---|---|---|
| | DATA TYPE | COORDINATES | OUTLINE DATA | COMMON STROKE CONSTRUCTION INFORMATION NUMBER | CHARACTER INFORMATION CHANGE DATA FOR EACH CHARACTER STYLE |
| 947C "培" | COMMON STROKE CONFIGURATION INFORMATION | (P30, P31) | B100 | A100 | CHARACTER STYLE T △P30 |
| | COMMON STROKE CONFIGURATION INFORMATION | (P32, P33) | B101 | A101 | — |
| | COMMON STROKE CONSTRUCTION INFORMATION CHANGE DATA | | | | |
| | GENERATION SIZE | CHANGE DATA | | | |
| | (16, 16) | △P67 | | | |
| | ⋮ | ⋮ | | | |

| CHARACTER STYLE | COMMON STROKE INFORMATION NUMBER | COMMON STROKE CONSTRUCTION INFORMATION ||||||
|---|---|---|---|---|---|---|---|
| | | DATA TYPE | COORDINATES | OUTLINE DATA NUMBER | COMMON STROKE INFORMATION NUMBER | COMMON STROKE INFORMATION CHANGE DATA | COMMON BIT MAP CHANGE DATA |
| S | A100 | STROKE CONFIGURATION INFORMATION | (P50, P51) | B100 | — | — | — |
| | | STROKE CONFIGURATION INFORMATION | (P52, P53) | B101 | — | — | — |
| | | STROKE CONFIGURATION INFORMATION | (P54, P55) | B100 | — | — | — |
| | A101 | COMMON STROKE CONSTRUCTION INFORMATION | (P56, P57) | — | A102 | △ P67 | SIZE (6, 10) / COORDINATES (5, 3) |
| | | COMMON STROKE CONSTRUCTION INFORMATION | (P58, P59) | — | A103 | — | — |
| ...... | | ...... | ...... | | | ...... | ...... |

CHARACTER STYLE S          CHARACTER STYLE T

Fig. 9

CHARACTER PATTERN GENERATOR, CHARACTER GENERATING METHOD, AND STORAGE MEDIUM THEREFOR

CROSS-REFERENCES TO RELATED APPLICATIONS

This application is related to Japanese patent application No. HEI 9(1997)-317058 filed on Nov. 18, 1997 whose priority is claimed under 35 USC §119, the disclosure of which is incorporated herein by reference in its entirety.

BACKGROUND OF THE INVENTION

1. Field of the Invention

The present invention relates to a character pattern generator, a character generating method, and a storage medium therefor, and more particularly to a character pattern generator which is used as a document processing device in a word processor, a personal computer or the like and which generates a bit map font at a high speed, and a storage medium containing a program for controlling the character pattern generator.

2. Description of the Related Art

Heretofore, a method for generating character patterns by outline font is known as a method for generating smooth character patterns without ruggedness in contrast to the bit map font. This outline font method involves a problem because a character pattern is generated by using, as a font data, coordinates of a plurality of control points obtained by sampling the outline of a character, performing a coordinate transformation in accordance with a character size or a character style, and painting the inside of the outline, so that the amount of data for the coordinates of the control points that must be stored increases as compared with the bit map font, thus requiring a ROM of large scale and, further, decreasing the speed of generating the character patterns.

Accordingly, Japanese Unexamined Patent Publication No. HEI 6(1994)-167963 proposes a method and apparatus for generating character patterns in which a large amount of font data can be stored with reduced memory capacity. This character pattern generating method involves storing figure information expressing a common element constituting the a character patterns and construction information of the figure information corresponding to respective characters, expanding each of the figure information corresponding to a designated character into a bit map, and synthesizing the expanded bit map data in accordance with the construction information to generate the character pattern. Also, by storing the bit map data of the expanded figure information, if the figure information is to be expanded into bit map data and the corresponding bit map data are already stored, the character pattern is generated by synthesizing the stored bit map data.

According to the character pattern generating method disclosed in the above Japanese Unexamined Patent Publication No. HEI 6(1994)-167963, the figure information is configured in coordinates of the control points that can specify the outline showing a part of the character pattern, so that the data amount of the coordinates of the control points can be reduced in proportion to the communization of the figure information by storing the common figure information in a lump. However, this method involves a problem that the speed of generating the character patterns decreases in the same manner as in the case of the outline font because, in expanding the figure information into bit map data, the construction information of the character is transformed in accordance with the designated character size and synthesized into the bit map data by transforming the size/position of each figure information in accordance with the transformed construction information.

SUMMARY OF THE INVENTION

The present invention has been made in view of these circumstances and the purpose thereof is to provide a character pattern generator and a character generating method capable of generating a bit map font at a high speed without expanding the figure information into outline data, for example, by generating the bit map font directly from the skeleton coordinate data of strokes constituting the character pattern, and a storage medium therefor.

Accordingly, the present invention provides a character pattern generator including: an input section for inputting an input information that contains a character code, a character style, and a character size of a character pattern to be generated; a character information storing section for storing, for each character code, a character information containing a stroke configuration information composed of a skeleton coordinate data of strokes constituting the character pattern; a bit map font generating section for reading, from the character information storing section, the stroke configuration information contained in the character information based on the input information input by the input section and for generating a bit map font based on the skeleton coordinate data of the stroke configuration information that has been read; and an output section for outputting, as a character pattern, the bit map font generated by the bit map font generating section.

BRIEF DESCRIPTION OF THE DRAWINGS

The present invention will be better understood from the following detailed description of preferred embodiments of the invention, taken in conjunction with the accompanying drawings, in which:

FIGS. 4(1) and 4(2) are views for explaining a character information of a Kanji character "慈" stored in a character information storing section according to the embodiment of the present invention;

FIGS. 5(1) and 5(2) are views showing an image of the character information of FIG. 4;

FIGS. 7(1) and 7(2) are views showing images of the common stroke construction information of FIG. 6;

DETAILED DESCRIPTION OF THE PREFERRED EMBODIMENTS

A character pattern generator of the present invention includes: an input section for inputting an input information that contains a character code, a character style, and a character size of a character pattern to be generated; a character information storing section for storing, for each character code, a character information containing a stroke configuration information composed of skeleton coordinate data of strokes constituting the character pattern; a bit map font generating section for reading, from the character information storing section, the stroke configuration information contained in the character information based on the input information input by the input section and for generating a bit map font based on the skeleton coordinate data of the stroke configuration information that has been read; and an output section for outputting, as a character pattern, the bit map font generated by the bit map font generating section.

In the present invention, the input section is preferably composed of an input device such as a key board, a pen tablet, an icon, or the like. The character information storing section is preferably composed of a storage device such as a ROM, a floppy disk, a hard disk, or the like. The bit map font generating section is preferably composed of a microcomputer including a CPU, a ROM, a RAM, an I/O port, and the like. The output section is preferably composed of a display device such as an LCD (Liquid Crystal Display), a CRT display, a plasma display, or the like, and a printing device such as a thermal printer, a laser printer, or the like.

According to the present invention, a bit map font can be generated at a high speed, without expanding a figure information into outline data, by generating the bit map font directly from the skeleton coordinate data of each stroke constituting the character pattern.

The character information may further contain a common stroke construction information obtained by a combination of one or more common stroke configuration information. According to the above construction, the data volume of the character information storing section can be further reduced by, for example, communizing a common stroke configuration information as a "radical" construction information constituting a "radical" of a Kanji character.

The common stroke construction information may further contain a position/size information indicating a position/size of one or more common stroke configuration information. According to the above construction, the bit map font can be generated by, for example, taking into account a balance and size of "radicals" of a Kanji character constructed with the common stroke construction information by separately providing a position/size information indicating the position/size of the common stroke construction information.

The character information may further contain a common stroke construction information obtained by a combination of one or more common stroke configuration information and a correction data for correcting the skeleton coordinate data of the stroke configuration information of the common stroke construction information. According to the above construction, the balance of "radicals" of a Kanji character constructed with the common stroke construction information can be corrected.

The character information storing section may store, for each character code and for each character style, the character information containing the stroke configuration information composed of the skeleton coordinate data of strokes constituting the character pattern. According to the above construction, the bit map font can be generated for each character style directly from the skeleton coordinate data of the strokes constituting the character pattern.

The character information storing section preferably stores the common stroke construction information obtained by a combination of one or more common stroke configuration information and the correction data for correcting the common stroke configuration information of the common stroke construction information. According to the above construction, the stroke configuration information can be corrected for each character.

The character pattern generator of the present invention may further include a common bit map data storing section for storing a common bit map data that corresponds to a common stroke construction information obtained by a combination of one or more common stroke configuration information, whereby the character generating section converts the common stroke configuration information into a bit map data by retrieving the common bit map data stored in the common bit map data storing section. According to the above construction, the bit map font can be generated by converting the common stroke configuration information into the bit map data at a high speed and combining the converted bit map data.

The common bit map data storing section may further store, for each character code, the correction data for correcting the common bit map data. According to the above construction, the bit map data can be corrected with the correction data in generating the bit map font by combining the common bit map data.

The common bit map data storing section may further store, for each character style, the common bit map data that corresponds to the common stroke construction information obtained by a combination of one or more common stroke configuration information. According to the above construction, the bit map font can be generated by combining the common bit map data corresponding to the character style.

The common bit map data storing section may further store, for each character style, the correction data for correcting the common bit map data. According to the above construction, the bit map font of a designated character style can be generated by combining the common bit map data for each character style.

The character pattern generator of the present invention may further include an enlargement/contraction converting section for determining a ratio of enlargement/contraction of the skeleton coordinate data of the stroke configuration information in accordance with the character size. According to the above construction, the bit map font conforming to a designated character size can be generated by determining the ratio of enlargement/contraction in accordance with the character size.

The skeleton coordinate data of the stroke configuration information may contain coordinate values of at least a starting point and an ending point of the stroke. According to the above construction, the bit map data can be generated by taking into account a balance and size from the skeleton coordinate data of the stroke.

The character pattern generator of the present invention may further include an outline data storing section for storing, for each character code and for each character style, an outline coordinate data of common strokes of the character pattern, and an outline font generating section for reading the outline coordinate data from the outline data storing section based on the input information input by the input section and for generating an outline font based on the outline coordinate data that has been read. According to the above construction, the outline font also can be generated by storing the outline coordinate data beforehand in the outline data storing section.

EMBODIMENTS

The present invention is now detailed by way of embodiments with reference to the accompanying drawings. It is to be noted that the present invention is not limited by these embodiments and the drawings.

Figure 1:
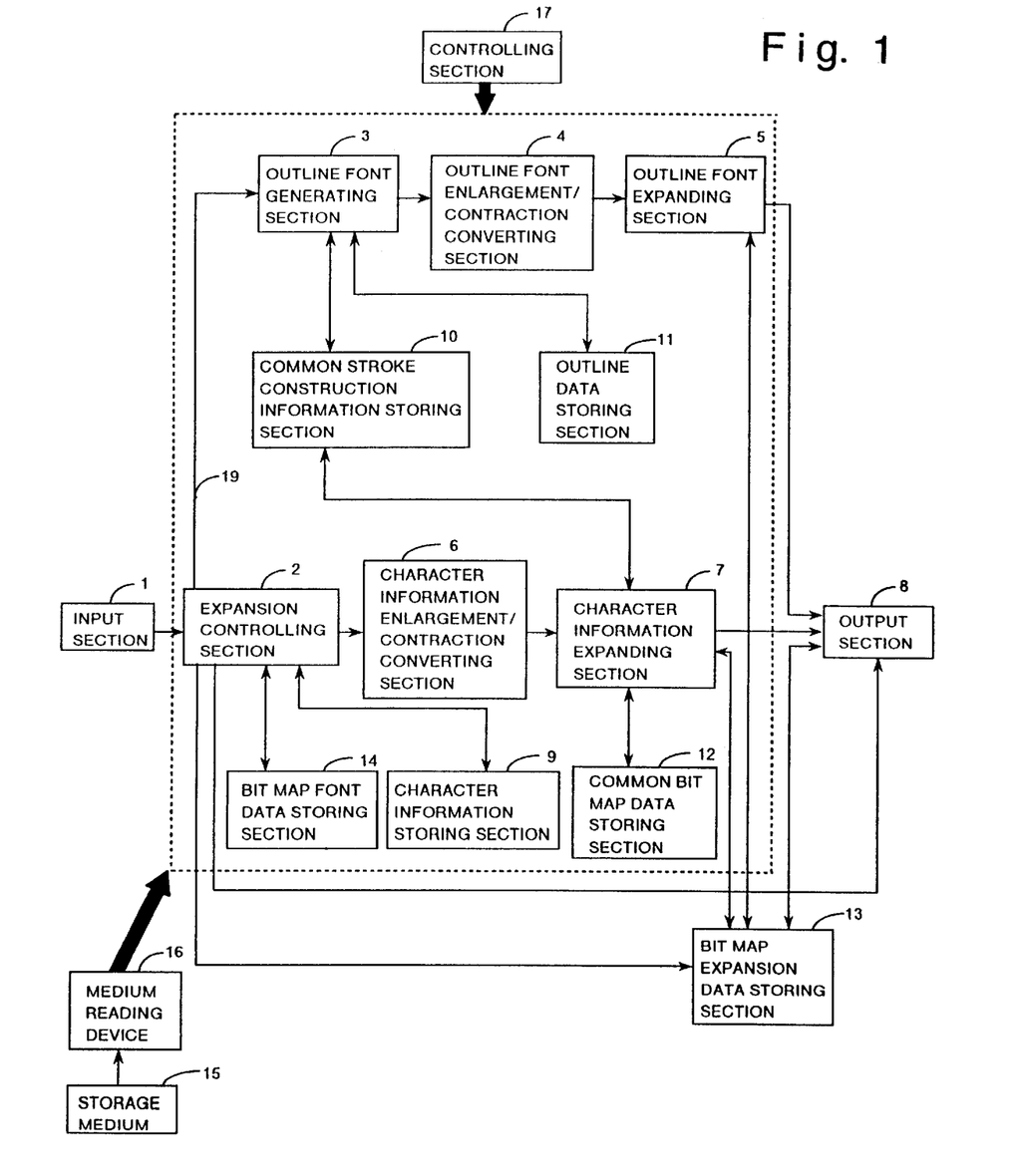
FIG. 1 is a block diagram showing a hardware construction of a character pattern generator according to an embodiment of the present invention.

FIG. 1 is a block diagram showing a hardware construction of a character pattern generator according to an embodiment of the present invention. In FIG. 1, the reference numeral 1 represents an input section including an input device such as a keyboard, a pen tablet, or an icon. The input section 1 inputs character generation parameters such as a character code, a character style, and a character size of a bit map font to be generated and optionally a bit map generating method (i.e. which of an outline font expansion and a character information expansion is to be used), and issues a command to generate the bit map font.

The reference numeral 2 represents an expansion controlling section including a CPU and a program ROM. The expansion controlling section 2 switches the processing method of expanding the bit map font, and reads a character information from a character information storing section 9. The reference numeral 3 represents an outline font generating section including a CPU and a program ROM. The outline font generating section 3 reads character generation parameters and a character information from the expansion controlling section 2, and a stroke configuration information and an outline data from the common stroke configuration information storing section 10, the outline data storing section 11, or the like to generate an outline font.

The reference numeral 4 represents an outline font enlargement/contraction converting section including a CPU and a program ROM. The outline font enlargement/contraction converting section 4 performs an enlargement/contraction conversion of the outline font generated by the outline font generating section 3 in accordance with the character generation parameters.

The reference numeral 5 represents an outline font expanding section including a CPU and a program ROM. The outline font expanding section 5 expands into a bit map font the outline font converted by the outline font enlargement/contraction converting section 4, and stores the obtained bit map font in the bit map font expansion storing section 13.

The reference numeral 6 represents a character information enlargement/contraction converting section including a CPU and a program ROM. The character information enlargement/contraction converting section 6 performs an enlargement/contraction conversion of the character information in accordance with the character generation parameters from the expansion controlling section 2.

The reference numeral 7 represents a character information expanding section including a CPU and a program ROM. The character information expanding section 7 reads the character information converted by the character information enlargement/contraction converting section 6, the character generation parameters, the common stroke configuration information from the common stroke configuration information storing section 10, and the common bit map data from the common bit map data storing section 12 to expand the bit map font, and stores the expanded bit map font data in a bit map expansion data storing section 13.

The reference numeral 8 represents an output section including a display device such as an LCD (Liquid Crystal Display), a CRT display, or a plasma display, and a printing device such as a thermal printer or a laser printer. The output section 8 outputs as a bit map font the bit map information stored in the bit map font expansion storing section 13.

The reference numeral 9 represents a character information storing section including a ROM and a RAM. The character information storing section 9 stores a character information such as a stroke configuration information, a common stroke construction information, and a correction data, which is required in generating the character in accordance with the character code.

The reference numeral 10 represents a common stroke construction information storing section including a ROM and a RAM. The common stroke construction information storing section 10 stores a common stroke construction information obtained by a combination of one or more common stroke configuration information.

The reference numeral 11 represents an outline data storing section including a ROM and a RAM. The outline data storing section 11 stores an outline data for pasting in accordance with the stroke configuration information or generating an outline font.

The reference numeral 12 represents a common bit map data storing section including a ROM and a RAM. The common bit map data storing section 12 stores a bit map data that corresponds to the common stroke construction information.

The reference numeral 13 represents a bit map font expansion storing section including a ROM and a RAM. The bit map font expansion storing section 13 stores the bit map font data that has been expanded in accordance with the character generation parameters.

The reference numeral 14 represents a bit map font data storing section including a ROM and a RAM. The bit map font data storing section 14 stores the bit map font in accordance with the character style, the character code, the character size, or the like.

The reference numeral 15 represents a storage medium including a CD-ROM, an IC card, an MD, a floppy disk, or the like. The storage medium 15 stores an expansion control processing program, an outline font generation processing program, an outline font enlargement/contraction conversion processing program, an outline font expansion processing program, a character information enlargement/contraction conversion processing program, a character information expansion processing program, a character information, a common stroke configuration data, an outline data, a common bit map data, and a bit map font data.

The reference numeral 16 represents a medium reading device for reading various processing programs and various data stored in the recording medium 15 to install the processing programs and the various data in each of the sections 2–7 and in each of the storing sections 10–14.

The reference numeral 17 represents a controlling section including a microcomputer composed of a CPU, a ROM, a RAM, and an I/O port. The controlling section 17 controls the whole character pattern generator via a bus 18. The reference numeral 18 represents the bus through which addresses, character information, and various data are transferred by the controlling section 17.

A document processor, such as a word processor or a personal computer, incorporating the character pattern generator of this embodiment can convert various character patterns into bit maps at a high speed for printing.

Referring to FIG. 1, according to another aspect of the present invention, there is provided a storage medium containing a program for controlling a character pattern generator by means of a computer, the program performing the functions of: causing a computer operation to store a character information in a character information storing section for each character code, the character information containing a stroke configuration information composed of skeleton coordinate data of strokes constituting the character pattern; when an input information on a character code, a character style, and a character size of a character pattern to be generated is input by an input section, causing a computer operation to read, from the character information storing section, the stroke configuration information contained in a character information based on the input information, and to generate a bit map font based on the skeleton coordinate data of the stroke configuration information that has been read; causing a computer operation to output from an output section the generated bit map font as a character pattern.

Figure 2:
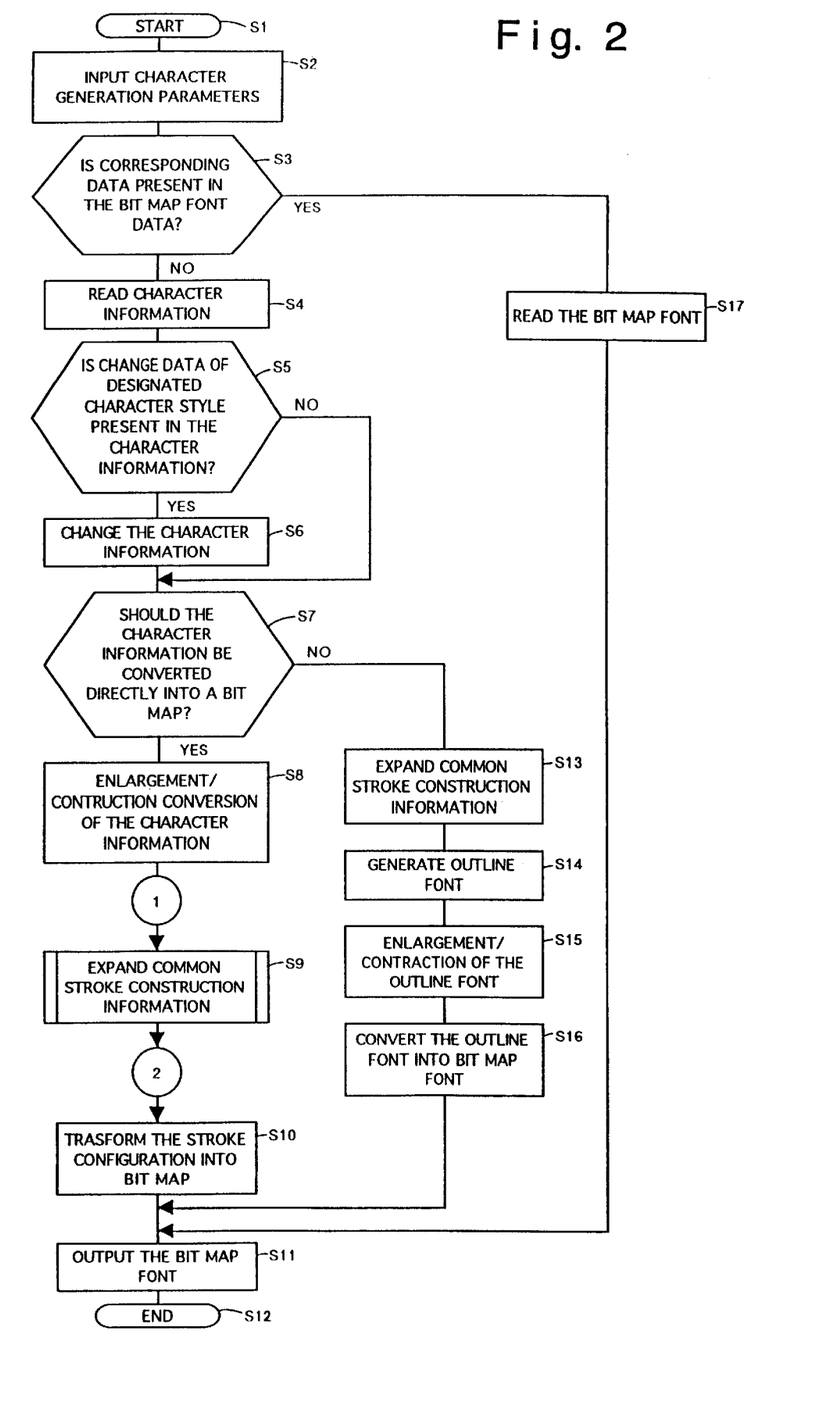
FIG. 2 is a flowchart showing a procedure of generating a bit map font of common stroke configuration information according to the embodiment of the present invention.

FIG. 2 is a flowchart showing a procedure of a character pattern generating process according to the character pattern generator of the embodiment of the present invention. In FIG. 2, a procedure for generating a character pattern of a bit map font from a character information will be explained in particular.

Step S1 : A bit map font generating process is started.

Step S2 : Character generation parameters such as a character code, a character style, and a character size of a character pattern to be generated, and a method of generating the character pattern (character pattern generation method by bit map font expansion or outline font expansion) are input from the input section 1.

Step S3 : The expansion controlling section 2 examines whether a bit map data corresponding to the character generation parameters is present in the bit map font data storing section 14 or not. If the data is present, the procedure goes to the step S17 and, if the data is not present, the procedure goes to the step S4.

Step S17 : The corresponding bit map font data is read from the bit map font data storing section 14 and is stored in the bit map expansion storing section 13. The procedure then goes to the step S11.

Step S4 : The character information corresponding to the character code in the character generation parameters is read from the character information storing section 9.

FIGS. 4(1) and 4(2) are views for explaining a character information of a Kanji character "播" stored in the character information storing section according to the embodiment of the present invention.

FIG. 4(1) shows a case in which the character information includes only the stroke configuration information. In this case, the character information includes a shift JIS (Japanese Industrial Standard) code of the character, the coordinate data of the stroke configuration information, the reference numbers of outline data corresponding thereto, and the data for changing the character information for each character style.

FIG. 4(2) shows a case in which the character information includes a common stroke construction information. In this case, the character information includes coordinates and reference numbers of the common stroke construction information, various data for changing the character information for each character style, and data for changing the common stroke construction information for each character generation size.

FIGS. 5(1) and 5(2) show images of the character information of FIGS. 4(1) and 4(2). Here, the case in which the character information includes individual stroke configuration information and the case in which the character information includes a common stroke construction information are separately shown. However, the character information may include both at the same time.

The character information including the common stroke construction information is converted into a bit map font after the character information is expanded into individual stroke configuration information. Accordingly, the expansion of the character information including the common stroke construction information shown in FIG. 4(2) will be explained hereafter.

Step S5 : The expansion controlling section 2 examines whether the character information read in the step S4 contains a change data of the character information, provided for each character style, corresponding to the character style to be generated.

If a character style T is to be generated, it is determined that the change data (correction data) is contained in the number A100 of the common stroke construction information, and the procedure goes to the step S6. If a character style other than the character style T is to be generated, the procedure goes to the step S7 because no change data is provided.

Step S6 : The expansion controlling section 2 changes the character information in accordance with the character information change data, provided for each character style, corresponding to the character style to be generated. In generating the character style T, the coordinate data is changed by adding the change data ΔP30 to P30, which is the coordinate data of the common stroke construction information A100 of the character information.

Step S7 : The expansion controlling section 2 examines which of the outline font expansion and the character information expansion (bit map font expansion) is to be used for converting the character information into a bit map font. This selection can be carried out through designation by the input section 1 together with the character generation parameters, or the judgment can be made in accordance with the condition such as the character size, the resolution of the output device, or the expansion speed.

If the outline font expansion is to be carried out, the procedure goes to the step S13 and, if the character information expansion is to be carried out, the procedure goes to the step S8.

Step S13 : The outline font generating section 3 expands the common stroke construction information in accordance with the character generation parameters.

Figure 6:
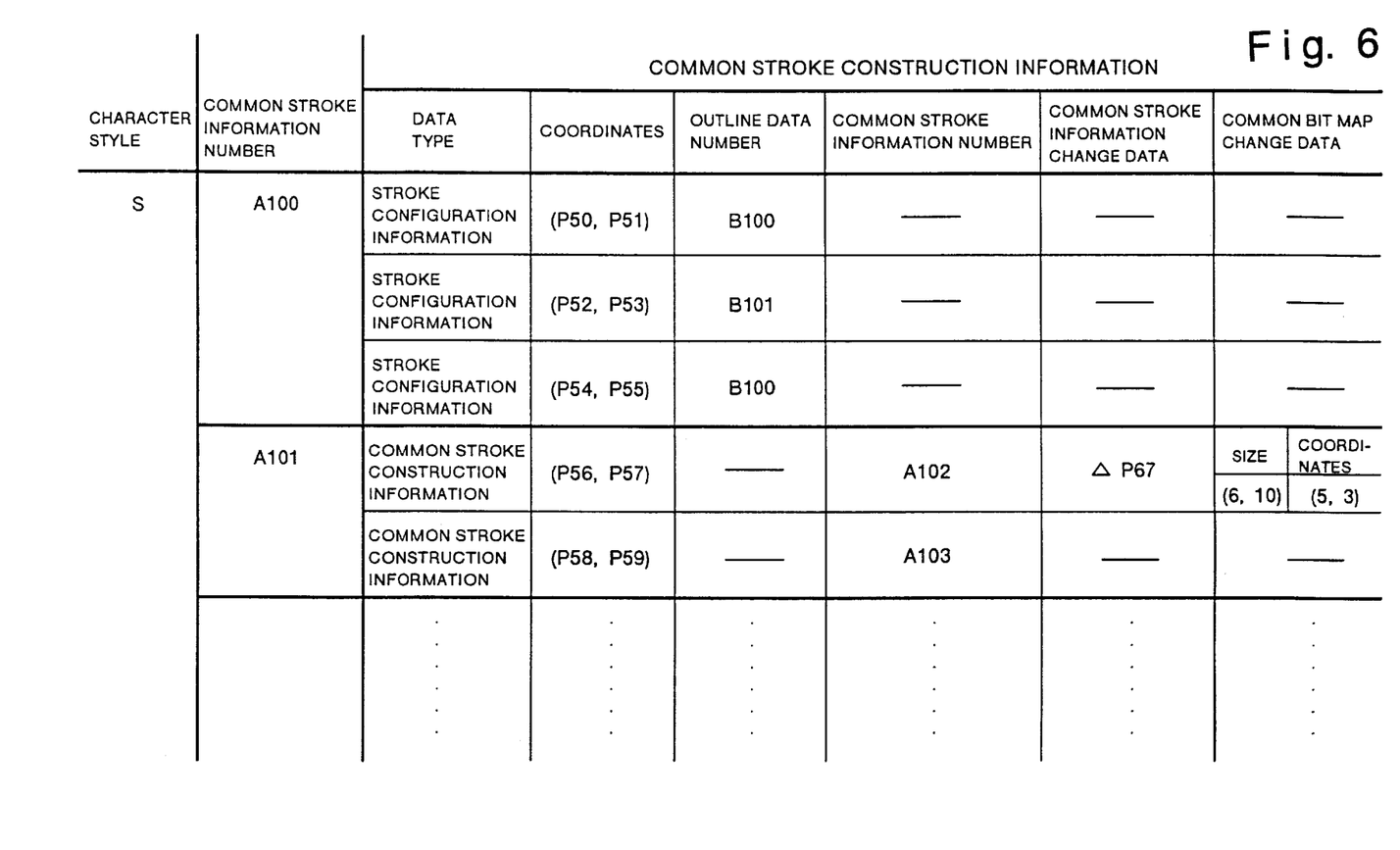
FIG. 6 is a view showing an example of a common stroke construction information of a character style S according to the embodiment of the present invention.
Figure 7:
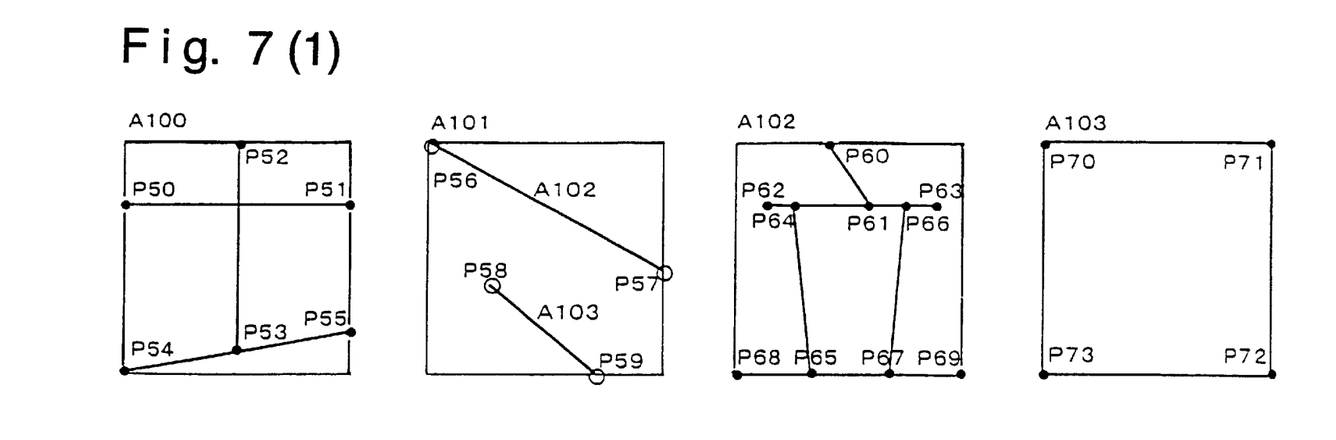

FIG. 6 shows an example of a common stroke construction information for a character style S according to the embodiment of the present invention. The common stroke construction information A100 is made of three common stroke configuration information having respective coordinates and reference numbers of the corresponding outline data. The common stroke construction information A101 is made of two common stroke construction information A102, A103, each having respective skeleton coordinates, common stroke configuration number, change data of the common stroke configuration information, and common bit map change data. Here, the common stroke configuration information is provided for each character style.

FIGS. 7(1) and 7(2) show images of the common stroke construction information of FIGS. 6. FIG. 7(1) shows a case for the character style S, and FIG. 7(2) shows a case for the character style T.

Next, a method for expanding the common stroke construction information of a Kanji character "播" will be explained. Referring to FIG. 4(2), the character information for the Kanji character "愛" contains a common stroke construction information A100. Accordingly, the common stroke construction information of A100 corresponding to the character style to be generated is read from the common stroke construction information storing section 10.

Next, the common stroke construction information A100 (P50 to P55) is converted into a size indicated by the coordinates (P30, P31) of the common stroke construction information A100 of the character information, and is synthesized at a corresponding position. Thus, the common stroke construction information A100 is expanded into individual stroke configuration information.

With respect to the common stroke construction information A101, corresponding data is read from the common stroke construction information storing section 10, and a similar size conversion is carried out for expansion into individual stroke configuration information.

However, since A101 includes the common stroke construction information A102, A103, the common stroke construction information A102, A103 are further read out. Further, since A102 includes a change data of the common stroke construction information, the coordinates are changed by adding ΔP67 to the coordinates of P67 of A102 which have been read out.

Thereafter, A102 and A103 are expanded using the coordinates (P56–P59) obtained by size conversion.

Step S14 : In the outline font generating section 3, an outline font is generated from the stroke configuration information and the outline data. Since the corresponding outline data number is attached to the stroke configuration information, the corresponding outline data is read and synthesized by conversion in accordance with the coordinates of the stroke configuration information.

Figure 8:
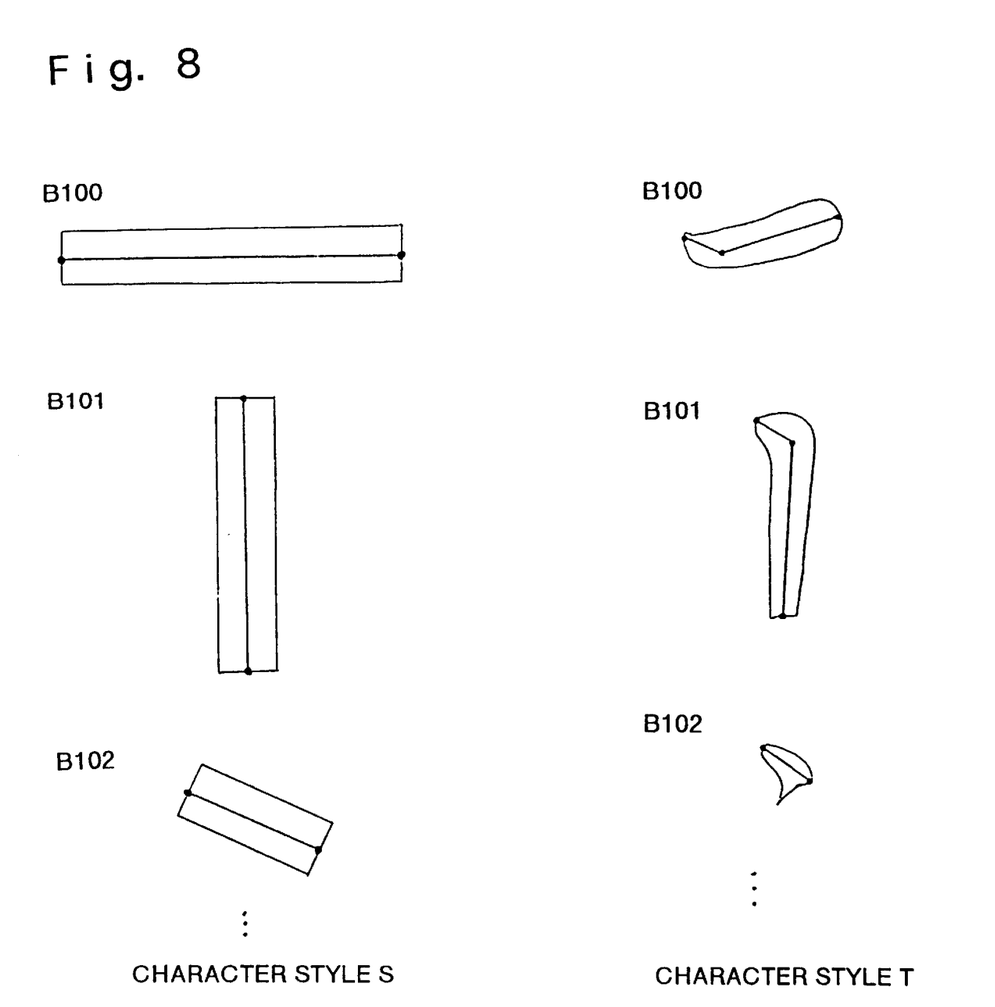
FIG. 8 is a view showing an example of an outline data corresponding to the stroke configuration information for each character style according to the embodiment of the present invention.

FIG. 8 is a view showing an example of an outline data corresponding to the stroke configuration information for each character style according to the embodiment of the present invention. In the stroke configuration information obtained by expansion of the common stroke construction information A100, the outline data B100 corresponds to (P50, P51), so that the data of B100 is read out from the outline data storing section 11 and synthesized by rotation or enlargement/contraction in accordance with the coordinates (P50, P51).

Step S15 : In the outline font enlargement/contraction converting section 4, the outline font generated by the outline font generating section 3 is converted by enlargement/contraction in accordance with the character size in the character generation parameters.

Step S16 : The outline font converted by the outline font enlargement/contraction converting section 4 is converted into a bit map font in the outline font expanding section 5. After the obtained bit map font is stored into the bit map expansion storing section 13, the procedure goes to the step S11.

Next, an explanation will be given of the process for the case where it is determined in the step S7 that the character information expansion is to be carried out.

Step S8 : In the character information enlargement/contraction converting section 6, the enlargement/contraction conversion is carried out on the character information from the expansion controlling section 2 in accordance with the character size in the character generation parameters.

Here, if the stroke configuration information is a skeleton data of a stroke, the stroke configuration information will be located at a center of each stroke having a thickness. Accordingly, the maximum frame of the stroke configuration will be smaller than the entire frame of the character.

Accordingly, in expanding the character information, a bit map font which is smaller than the designated character size may possibly be obtained. Accordingly, the maximum frame of the stroke configuration information is determined for each character, and a conversion ratio of the character information is obtained from the maximum frame of the stroke configuration information for enlargement/contraction conversion of the character information.

Step S9 : In the character information expanding section 7, the common stroke construction information of the character information converted by the character information enlargement/contraction converting section 6 is expanded (This procedure will be detailed using the flowchart of FIG. 3).

Figure 3:
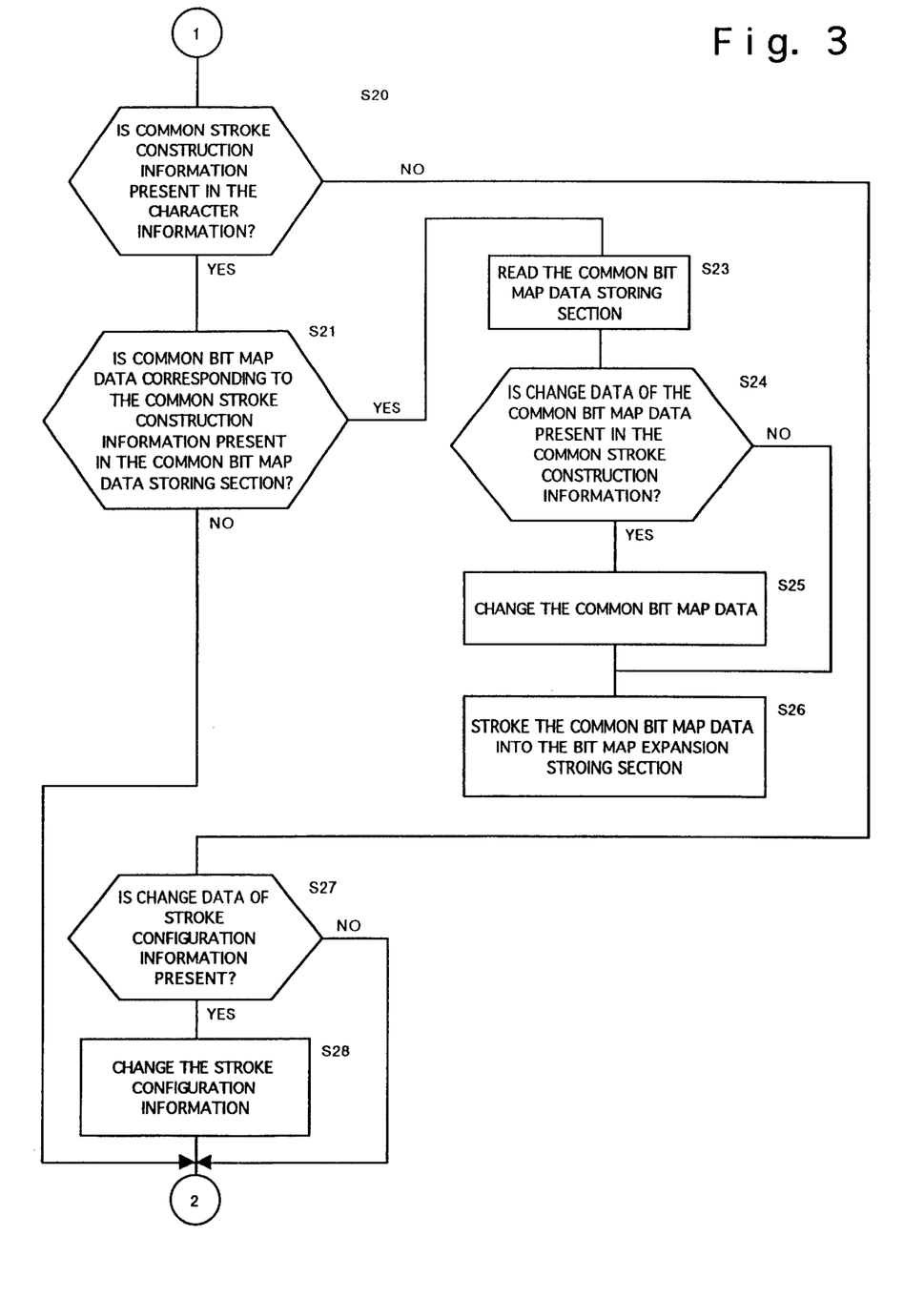
FIG. 3 is a flowchart showing a procedure of subroutine process of step 9 of FIG. 2.
Figure 4:
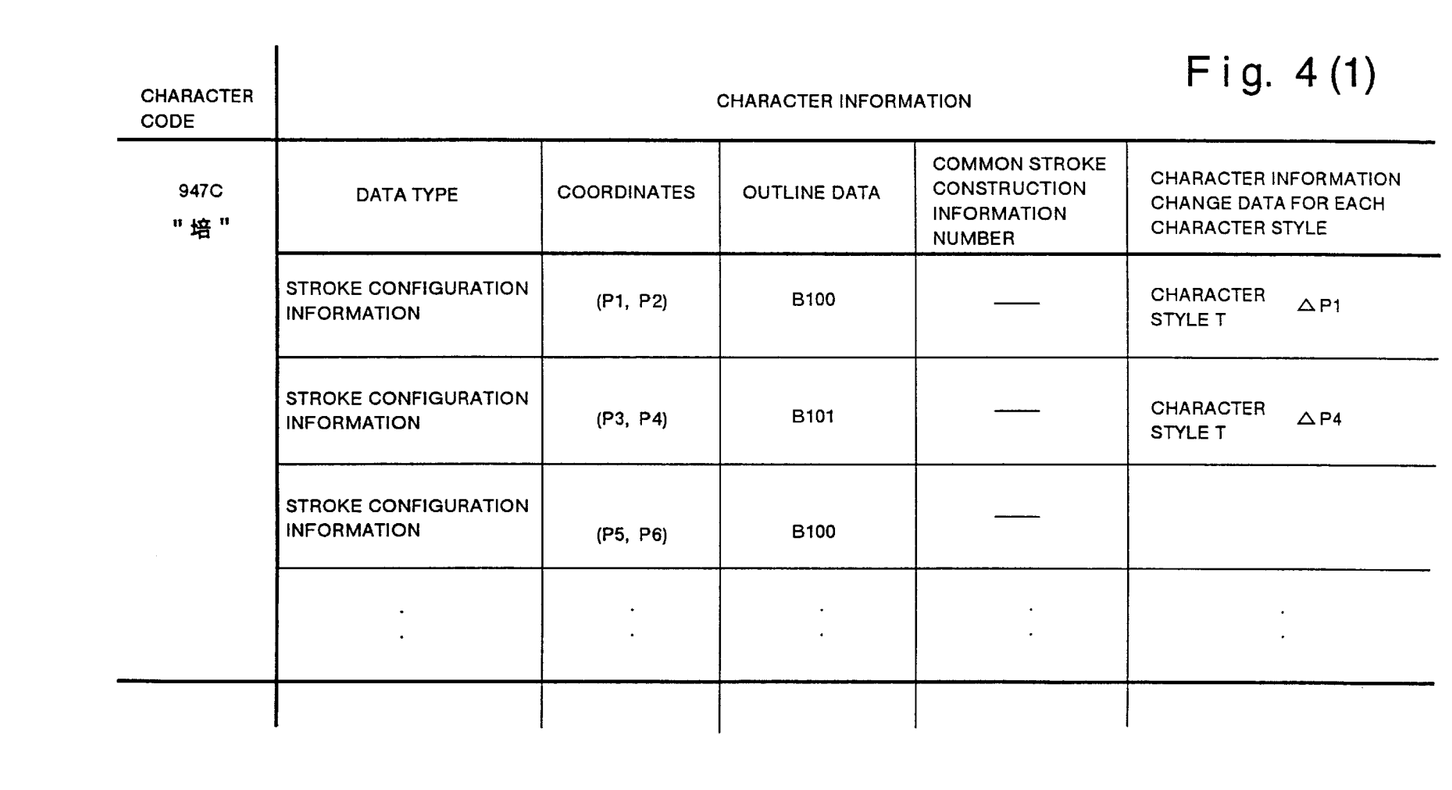
Figure 5:
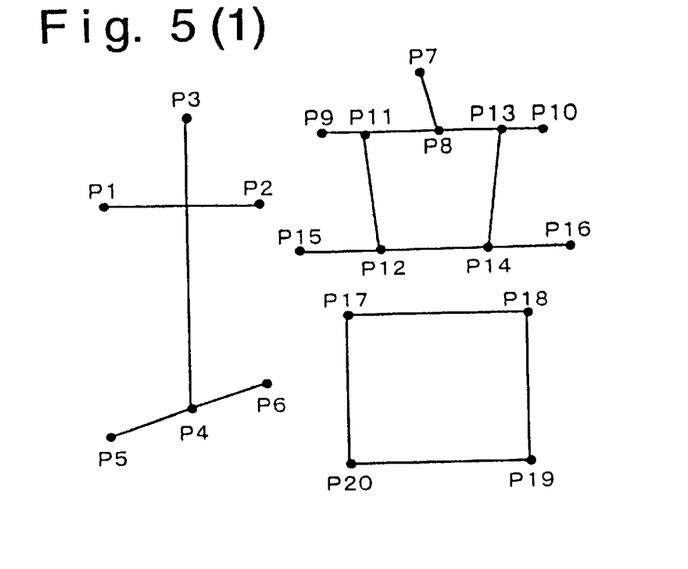

FIG. 3 is a flowchart showing procedures of a subroutine process in the step S9 of FIG. 2. Referring to FIG. 3, Step S20 : The expansion controlling section 2 examines whether a common stroke construction information is included in the character information to be expanded. If it is included, the process goes to the step S21; and, if it is not included, the process goes to the step S27.

The character information shown in FIG. 4(2) includes two common stroke construction information.

Step S21 : On the basis of the common stroke construction information number and the size represented by the coordinates in the character information, the expansion controlling section 2 examines whether a corresponding common bit map data is present in the common bit map data storing section 12. If it is present, the process goes to the step S23; and, if it is not present, the process goes to the step S22.

Figure 9:
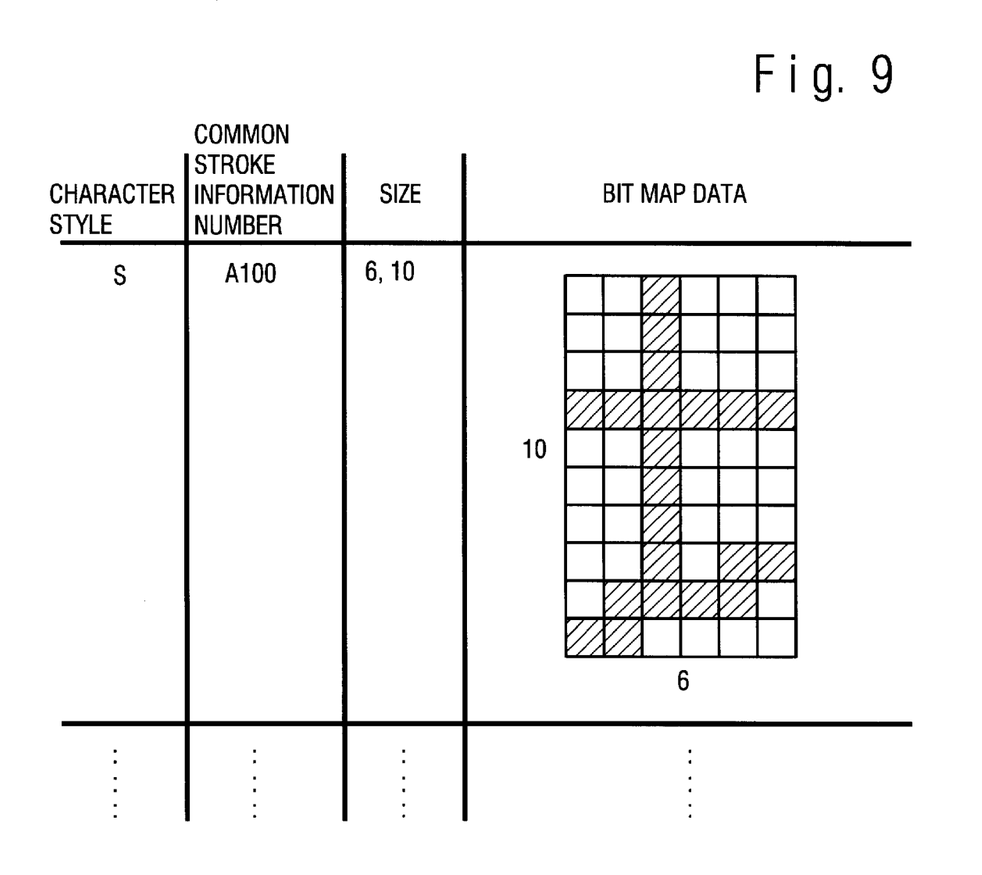
FIG. 9 is a view showing an example of the common bit map data according to the embodiment of the present invention.

FIG. 9 is a view showing an example of common bit map data according to this example. The bit map data is provided for each character style, common stroke configuration information number, and size.

Here, if the character information includes a common stroke construction information A100 with a character style S and the expansion size of A100 is 6 bits×10 bits, then it is determined that the corresponding data is present in the common bit map data storing section.

Step S22 : The common stroke construction information of the character information is expanded.

In this step, like the process of the step S13, in accordance with the common stroke construction information number in the character information, the corresponding data is read from the common stroke construction information storing section 10; the common stroke construction information is changed on the basis of the change data and subjected to an enlargement/contraction conversion and expansion; and the procedure then goes to the step S10.

Step S23 : The common bit map data corresponding to the common stroke construction information, which has been found out in the step S21, is read out from the common bit map data storing section 12.

Step S24: The expansion controlling section 2 determines whether a change data of the common bit map data is present in the common stroke construction information or not. If it present, the procedure goes to the step S25; and, if it is not present, the procedure goes to the step S26.

Step S25 : The conversion of the common bit map data is carried out. The change data of the common bit map data of a size (6, 10) of the common stroke construction information A102 is present in the common stroke construction information A101 of character style S. From this data, the black/white state of a bit at the coordinates (5, 3), as determined when the bit position on the upper-left point of the common bit map data is regarded as the origin (0, 0), is reversed to change the stroke shape of the bit map data.

Step S26 : In accordance with the coordinate position of the common stroke construction information, the common bit map data is stored into the bit map expansion data storing section 13, and the procedure goes to the step S10.

Step S27 : The expansion controlling section 2 determines whether a change data of the stroke configuration information is present in the character information or not. If it is present, the procedure goes to the step S28; and, if it is not present, the procedure goes to the step S10.

Since the character information of the Kanji character "媾" includes a change data of the common stroke construction information for the case in which the character generation size is (16 bits×16 bits), it is determined that the change is present only when the above character generation size coincides with that of the character information (See FIG. 4(2)).

Step S28 : A change to the stroke configuration information is made on the basis of the common stroke configuration information change data, and the procedure goes to the step S10. In the case of the character information of the Kanji character "媾", the change data ΔP67 is added to the point P67 of the stroke configuration information after the expansion (See, for example, A102 of FIG. 7(1)) to change the coordinates.

Step S10 : The stroke configuration information of the character information is expanded into a bit map. This may be carried out by a method in which a dot is generated when a line segment representing the stroke configuration information overlaps with a bit position on the bit map generation region, or by another method. The expanded bit map is stored into the bit map expansion storing section 13.

Step S11 : The bit map stored in the bit map expansion data storing section 13 is read out by the output section 8 and is output as a bit map font.

Step S12 : The process is ended.

According to the above construction, the following effects can be produced.

By communizing the stroke construction information, the volume of the data obtained by a combination of the same stroke configuration information such as a "radical" of a Kanji character can be reduced.

By providing the common stroke construction information in a recursive manner, the volume of the common stroke construction information can be reduced.

By allowing the common stroke construction information to include a data for changing the construction of the common stroke configuration information, a balance of the character can be corrected in further generating a common stroke construction information by a combination of common stroke configuration information.

By providing a common stroke construction information for each character style, the bit map font can be generated in accordance with the character style shape.

By allowing the character information to include a change data of the common stroke construction information, an adjustment of the stroke configuration information that somewhat varies character by character can be made.

By providing a bit map data corresponding to the common stroke construction information, the bit map font can be generated at a high speed.

By allowing the common stroke construction information to include a change data of the common bit map data, the bit map data can be changed in converting the common stroke construction information into a bit map.

By storing the common bit map data for each character style, the bit map can be generated in accordance with a given character style shape.

By allowing the character information to include a change data of the stroke configuration information for each character style, the stroke configuration information can be generated for a plurality of character styles.

By determining the enlargement/contraction ratio in accordance with the character size, the bit map font can be generated that conforms to a designated character generation size.

Since the stroke configuration information is a skeleton data, a high-quality outline font can be generated by adding an outline data to the skeleton data.

By storing the character patterns for bit map fonts beforehand, a bit map font can be generated at a high speed with respect to a stored character pattern.

According to the present invention, a bit map font can be generated at a high speed, without expanding a figure information into outline data, by generating the bit map font directly from the skeleton coordinate data of strokes constituting a character pattern.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A character pattern generator comprising:

an input section for inputting an input information that contains a character code, a character style, and a character size of a character pattern to be generated;

a character information storing section for storing, for each character code, a character information containing a stroke configuration information composed of skeleton coordinate data of strokes constituting the character pattern;

a bit map font generating section for reading, from the character information storing section, the stroke configuration information contained in the character information based on the input information input by the input section and for generating a bit map font based on the skeleton coordinate data of the stroke configuration information that has been read;

an output section for outputting, as a character pattern, the bit map font generated by the bit map font generating section;

a common bit map data storing section for storing a common bit map data that corresponds to a common stroke construction information obtained by a combination of one or more common stroke configuration information, whereby the character generating section converts the common stroke configuration information into a bit map data by retrieving the common bit map data stored in the common bit map data storing section; and wherein the common bit map data storing section further stores, for each character code, correction data for correcting the common bit map data.

2. The character pattern generator of claim 1, wherein the character information further contains said common stroke construction information.

3. The character pattern generator of claim 2, wherein the common stroke construction information further contains a position/size information indicating a position/size of one or more common stroke configuration information.

4. The character pattern generator of claim 1, wherein the character information further contains said common stroke construction information and correction data for correcting the skeleton coordinate data of the stroke configuration information.

5. The character pattern generator of claim 1, wherein the character information storing section stores, for each character code and for each character style, the character information containing the stroke configuration information composed of the skeleton coordinate data of strokes constituting the character pattern.

6. The character pattern generator of claim 1, wherein the character information storing section stores the common stroke construction information obtained by a combination of one or more common stroke configuration information and correction data for correcting the common stroke configuration information of the common stroke construction information.

7. The character pattern generator of claim 1, wherein the common bit map data storing section further stores, for each character style, the common bit map data that corresponds to the common stroke construction information obtained by a combination of one or more common stroke configuration information.

8. The character pattern generator of claim 1, wherein the common bit map data storing section further stores, for each character style, the correction data for correcting the common bit map data.

9. The character pattern generator of claim 1, further comprising an enlargement/contraction converting section for determining a ratio of enlargement/contraction of the skeleton coordinate data of the stroke configuration information in accordance with the character size.

10. The character pattern generator of claim 1, wherein the skeleton coordinate data of the stroke configuration information contains coordinate values of at least a starting point and an ending point of the stroke.

11. The character pattern generator of claim 1, further comprising an outline data storing section for storing, for each character code and for each character style, an outline coordinate data of common strokes of the character pattern, and an outline font generating section for reading the outline coordinate data from the outline data storing section based on the input information input by the input section and for generating an outline font based on the outline coordinate data that has been read.

12. A character pattern generating method comprising:

inputting, from an input section, an input information that contains a character code, a character style, and a character size of a character pattern to be generated;

storing, in a character information storing section for each character code, a character information containing a stroke configuration information composed of skeleton coordinate data of strokes constituting the character pattern;

reading, from the character information storing section, the stroke configuration information contained in a character information based on the input information input by the input section;

generating a bit map font based on the skeleton coordinate data of the stroke configuration information that has been read;

outputting, from an output section, the generated bit map font as a character pattern;

storing a common bit map data that corresponds to a common stroke construction information obtained by a combination of one or more common stroke configuration information;

converting the common stroke configuration information into a bit map by retrieving the common bit map; and storing, for each character code, correction data for correcting the common bit map data.

13. A storage medium containing a program for controlling a character pattern generator by means of a computer, the program performing at least the functions of:

causing a computer operation to store a character information in a character information storing section for each character code, the character information containing a stroke configuration information composed of skeleton coordinate data of strokes constituting the character pattern;

when an input information that contains a character code, a character style, and a character size of a character pattern to be generated is input by an input section, causing a computer operation to read, from the character information storing section, the stroke configuration information contained in a character information based on the input information;

causing a computer operation to generate a bit map font based on the skeleton coordinate data of the stroke configuration information that has been read;

causing a computer operation to output, from an output section, the generated bit map font as a character pattern;

causing a computer operation to store, in a common bit map data storing section, a common bit map data that corresponds to a common stroke construction information obtained by a combination of one or more common stroke configuration information; and causing a computer operation to convert the common stroke configuration information into a bit map data by retrieving the common bit map data stored in the common bit map data storing section.

14. The storage medium of claim 13, wherein the program further performs the function of causing a computer operation to store the character information in the character information storing section for each character code and for each character style, the character information further containing a common stroke construction information obtained by a combination of one or more common stroke configuration information.

15. The storage medium of claim 13, wherein the program further performs the function of causing a computer operation to store the character information in the character information storing section for each character code and for each character style, the character information further containing a common stroke construction information obtained by a combination of one or more common stroke configuration information and a position/size information indicating a position/size of the common stroke construction information.

* * * * *